Figure 1:
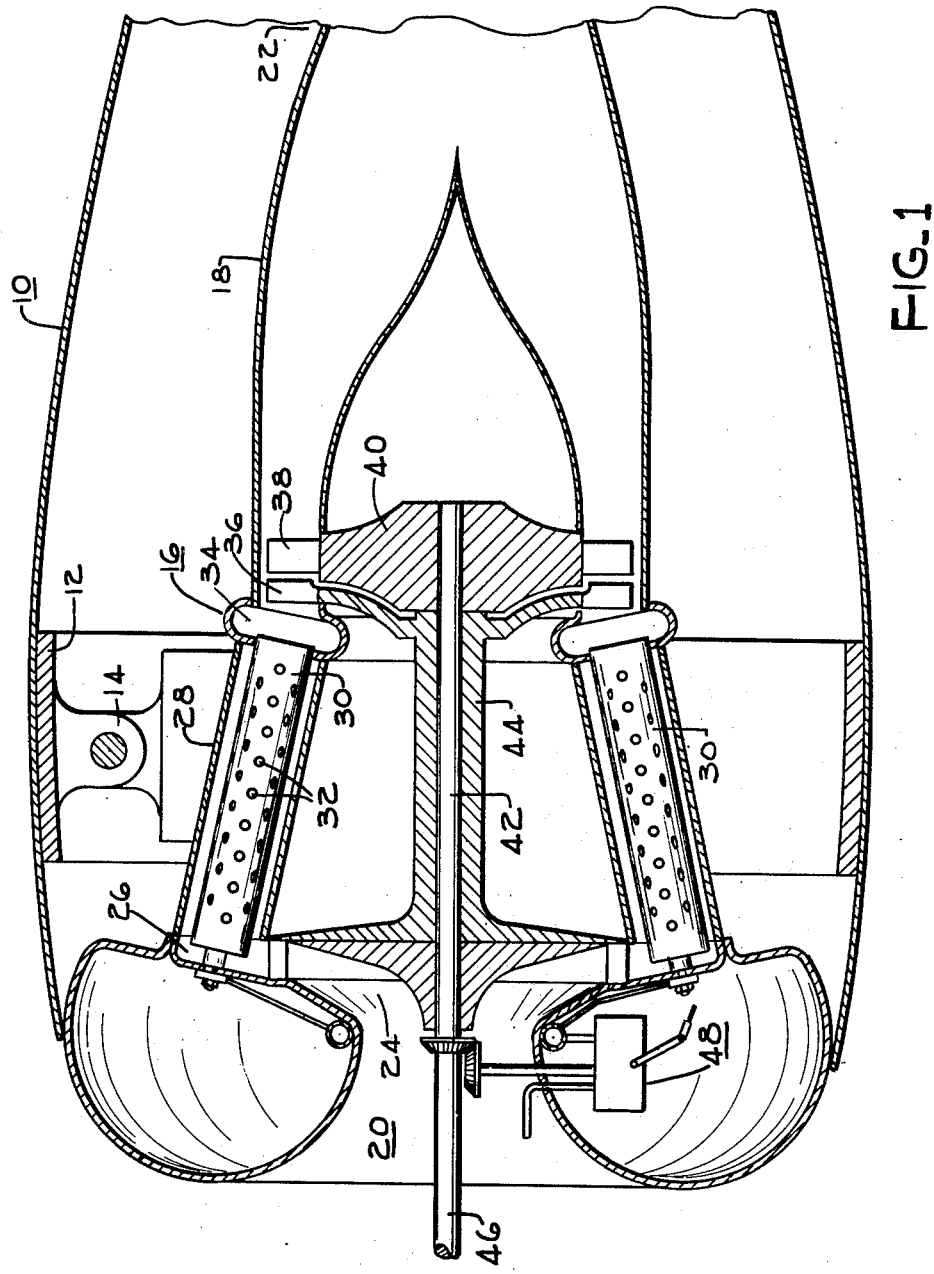

Nov. 10, 1953 — E. O. WIRTH ET AL — 2,658,566
FUEL FEED AND POWER CONTROL DEVICE FOR GAS TURBINES
Filed Aug. 20, 1945

INVENTOR.
EMIL O. WIRTH
BY FREDERIK BARFOD
W. A. Gebhardt
ATTORNEY

Patented Nov. 10, 1953

2,658,566

UNITED STATES PATENT OFFICE 2,658,566

FUEL FEED AND POWER CONTROL DEVICE
FOR GAS TURBINES

Emil O. Wirth and Frederik Barfod, South Bend,
Ind., assignors to Bendix Aviation Corporation,
South Bend, Ind., a corporation of Delaware Application August 20, 1945, Serial No. 611,599

13 Claims. (Cl. 158—36.4)

This invention relates to a fuel-feed and power control device for gas turbines, jet propulsion engines and like power plants utilizing the force or energy produced by the combustion and expansion of precompressed air. It is particularly adapted for jet propulsion power plants for aircraft wherein the air is compressed into a chamber constituting part of a generator, at which point it is heated by the combustion of fuel. The air and products of combustion are then passed through a turbine for driving a compressor and then discharged through a reaction jet to propel the aircraft. The invention may also be used in power plants for aircraft wherein a gas turbine drives the propeller of the aircraft and may in addition drive a compressor for supplying air to a combustion chamber or generator, and wherein also the exhaust from the turbine may be discharged through a reaction jet to obtain a propulsion effect augmenting that of the propeller.

When a centrifugal or axial flow compressor is connected to and rotated in synchronism with a gas turbine driven by the energy of expanded gases produced in a combustion chamber or burner in which the air is compressed, at a given entering air density the weight of air flowing will vary approximately with the R. P. M., the pressure of compression will vary approximately with the square of the R. P. M., and the power required for compression and accompanying air flow will vary approximately with the cube of the R. P. M. When power is controlled by regulation of the fuel feed, the rate of feed required will vary approximately with the R. P. M.$^3$, and accordingly, if the fuel feed is selected, the turbine speed will either increase or decrease until a speed corresponding to the selected fuel feed is obtained.

The present invention provides an extremely simple power control arrangement for gas turbine engines and jet propulsion may be effected by connecting a power control lever or equivalent device for controlling the quantity of fuel supplied to the engine, said fuel being supplied under a pressure head which is proportional to the square of engine speed. With this arrangement, the pilot advances or retracts the control lever to obtain a selected speed, whereupon the engine speeds up or slows down to a speed corresponding to the rate of fuel feed set by the control lever.

It is also desirable to provide some means for compensating for changes in entering air density irrespective of what type of power control system is adopted, since less fuel is required to drive a turbine and compressor at a given speed upon a decrease in density. If the rate of fuel feed were not varied as a function of entering air density engine speed would increase with each decrease in density at any given position of the power control lever, while an engine acceleration at altitude would result in excessive turbine temperatures. It is therefore an object of the present invention to provide means or automatically regulating the device to compensate for changes in entering air density.

Another object of the present invention is to provide a fuel-feed and power-control system for power plants of the type specified wherein the rate of fuel feed supplied to the engine may be controlled by a single lever at all conditions of engine operation.

A further object is to generally improve and simplify fuel-feeding systems for power plants of the type specified.

Figure 2:
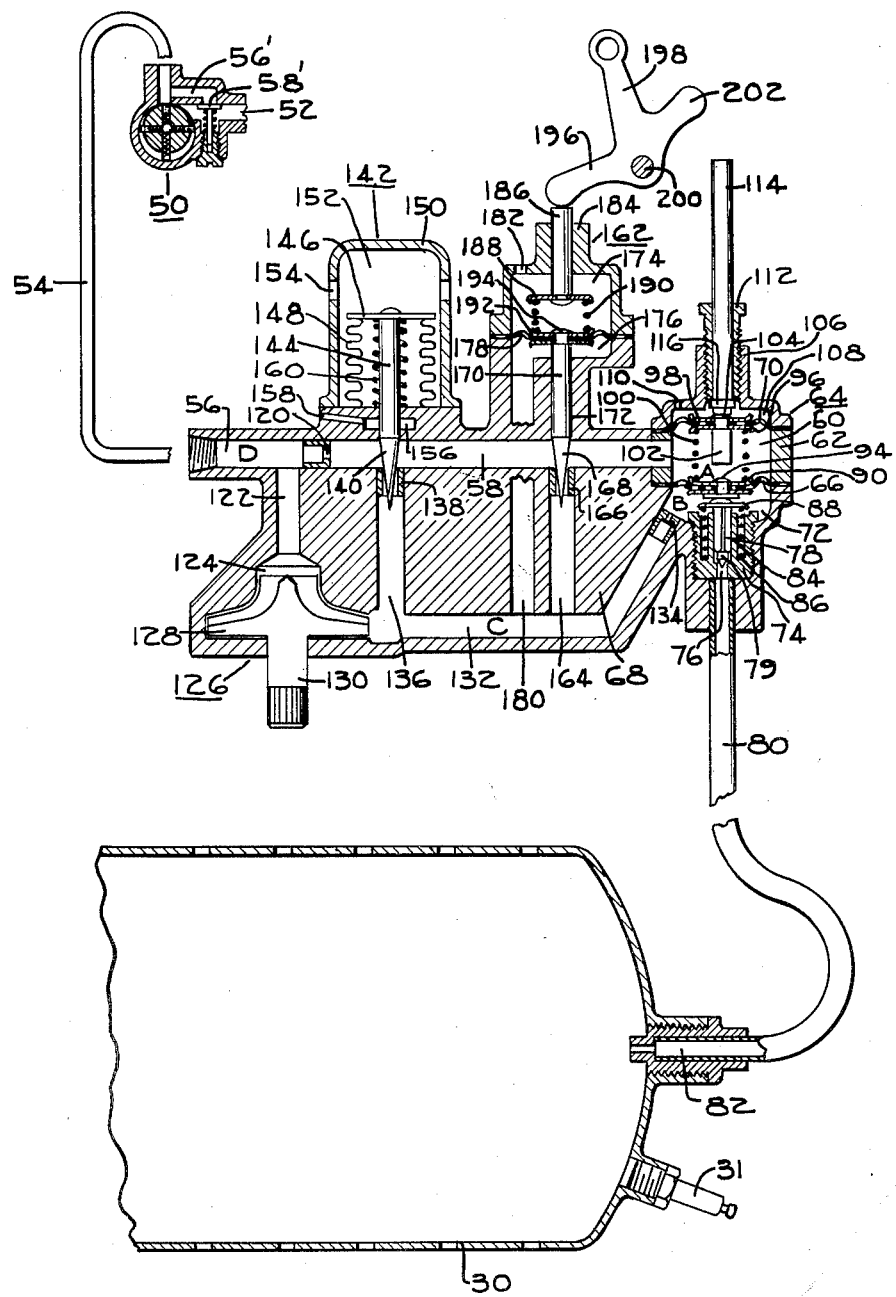

The foregoing and other objects and advantages will become apparent in view of the following description taken in conjunction with the appended drawings, in which:

Figure 1 is a substantially central longitudinal sectional view of a jet propulsion power plant or engine incorporating a fuel-feed and power-control system in accordance with the present invention; and Figure 2, an enlarged detail view in section, and to some extent diagrammatic, of the fuel-metering and power-control unit.

Referring first to Figure 1, an aircraft engine nacelle is indicated at 10 and has supported therein as by means of ring 12 and brackets 14, a jet propulsion engine or power plant, generally indicated at 16, and including an outer casing 18, flared or curved at its front extremity to define an air inlet 20 and contoured at its rear extremity to define a reaction tube 22. A rotary air compressor 24 forces air into an annular chamber 26 which supplies it to a plurality of peripherally spaced cylinder-like generators or burner chambers 28 containing burners 30 having air-inlet holes 32 in the peripheral walls thereof. The burners 30 discharge into a collector ring 34 arranged to deliver the hot air and products of combustion through a set of stationary directing blades 36 against the blades 38 of a turbine rotor 40. The turbine 40 and air compressor 24 are mounted on a common shaft 42 rotatably supported by a bearing 44. Air entering the inlet 20 is picked up by the compressor, which acts to direct the air into annular chamber 26 and generators 28, and thence into the burners 30 through holes 32, where heat is added by the combustion of fuel, there being an igniter 31 for each burner. The expanded air and products of combustion are directed against the blades 38 of the turbine 40 to drive the compressor and are then discharged to the atmosphere through the reaction tube 22 to effect propulsion of the plane. If desired, propulsion of the plane may also be accomplished by a propeller attached to the forward portion 46 of shaft 42, although if desired the propeller may be mounted on a shaft, driven by shaft 42, through suitable reduction gearing. The fuel metering and power-control unit, generally indicated at 48, is adapted to control the flow of liquid fuel to the burners 30, and is described below.

The fuel system

Referring now to Figure 2, any suitable source of liquid fuel may be provided. For example there may be an engine operated pump, indicated generally at 50, which is capable of supplying fuel under a positive and preferably but not necessarily substantially constant, predetermined pressure. This pump may be of any well known type but, as shown, is of the sliding vane type having an inlet 52 receiving fuel from a suitable source, an outlet conduit 54 and a bypass 56' controlled by a pressure responsive valve 58'. Fuel from the pump is delivered from the pump outlet conduit 54 to a passage 56 which communicates with a passage 58 connected with a chamber 60 in a casing 62 of a fuel flow control device, indicated generally at 64. The fuel pressure in said chamber 60 is at all times substantially the same as that in passage 58, this pressure in said chamber and passage being hereinafter referred to as pressure A or control pressure. In the control device 64 one side of chamber 60 is closed by a flexible diaphragm 66 which is marginally clamped between the casing 62 and a shoulder of body 68 of the device. Opposite the diaphragm 66 is a diaphragm 70 spaced from said diaphragm 66. On the side of the diaphragm 66 opposite the chamber 60 is a second fuel chamber, 72. A fitting 74 is screwed into a bore provided in the body 68 and includes an orifice 76 which is controlled by a valve 78 having a fluted stem which permits fuel to flow therepast, there being a valve tip 79 which cooperates with the orifice 76 to control the fuel flow through said orifice. Fuel passing through orifice 76 enters a fuel conduit 80 which is connected with a fuel nozzle 82 of the burner 30. A spring 84 is located in a recess 86 in the fitting 74 and reacts between the bottom of said recess and a spring retainer 88 secured to valve 78, said spring being adapted to urge the valve in the opening direction. The diaphragm 66 is provided, on its opposite side, with a second spring retainer, 90, secured to the central portion of said diaphragm by a rivet 94 which is adapted to abut against the adjacent end of the valve 78 and form a one-way connection therebetween. The diaphragm 70 is also provided with spring retainers or reinforcing washers on opposite sides thereof, said washers being indicated generally at 96 and 98. A spring 100 reacts between the retainers 90 and 96 for urging the valve in the closing direction. A stud 102 is secured to the diaphragm 70 and the free end of said member is adapted to engage the adjacent end of rivet 94 as will be hereinafter more fully described. The stud 102 and spring retainers 96 and 98 are secured to diaphragm 70 by turning over the outer end 104 of a reduced diameter portion of the stud, which extends through said diaphragm 70 and spring retainers.

A casing 106 encloses a chamber 108, vented at 110, which has an outwardly extending tubular portion having a threaded bore in which is received a bearing 112 within which an idle cut off plunger 114 is adapted to slide. The plunger has an annular flange 116 adjacent its inner end to limit outward movement thereof and said inner end comprises a stop against which the turned over portion 104 of stud 102 abuts.

A restriction or jet 120 is provided between the passages 56 and 58 through which fuel is adapted to flow. Passage 56 is provided with a branch passage 122 which communicates with the impeller chamber 124 of a pump, indicated generally at 126. This pump, as shown, is of the centrifugal type which includes an impeller 128 driven by the engine through a shaft 130 which is suitably connected, by any well known means, with said engine which rotates said impeller in direct proportion to the R. P. M. thereof and is adapted to build up an outlet pressure which provides the metering head for the system.

The outlet of pump 126 is connected to a passage 132 communicating with the chamber 72 by way of a metering restriction or jet 134 therein, the pressure of fuel in said chamber 72 being at all times substantially the same as that in the passage 132 posterior to the jet 134 and this pressure in chamber 72 and passage 134 posterior to jet 134 will be hereinafter referred to as pressure B or metered fuel pressure.

The passage 132 anterior to the metering orifice 134, is connected with passage 58, there being a restriction or orifice 138 provided in the conduit 136. It is to be noted that the fuel pressure in that portion of conduit 136 which is on the centrifugal pump side of orifice 138, that is between orifice 138 and conduit 132, is at all times substantially the same as the pressure in that portion of the passage 132 anterior to jet 134 and the pressure in said portions of the conduit and passage will be hereinafter referred to as pressure C or the metering head.

Means for varying the effective size of orifice 138 comprises a valve 140 controlled by a device indicated generally at 142, which is responsive to barometric pressure. The valve 140 is connected to or formed integral with a valve stem 144 slidable in a bore provided therefor in body 68, said stem 144 being connected at its outer end to a plate 146 forming one wall of a sealed expansible bellows 148 enclosed by a casing 150 which is supported on the body 68 by any suitable well known means such as screws, not shown. The interior chamber 152 of casing 150 is connected to atmosphere by ports 154 so that the bellows expands or contracts in accordance with said pressure and thus regulates the effective size of the orifice 138 according thereto. A drain, for draining off fuel which might seep past valve stem 144, comprises an annular recess 156 connected to a drain tube 158 leading to any suitable point of disposal such as the fuel tank. A light compression spring 160 also may be provided within the bellows, an arrangement that is particularly desirable if the bellows is partially or completely evacuated, to extend the bellows to a normal balanced position and it may be desirable for said spring and bellows to be so calibrated and arranged that the valve 140 will be normally closed at sea level pressure.

It is also to be noted that the pressure in branch passage 122 is at all times substantially the same as that in passage 56 and the pressure in said passages will be hereinafter referred to as pressure D or pump inlet pressure.

The device also includes manual control means which, as shown, comprises a control unit, indicated generally at 162, which is adapted to control a passage 164 which connects the passage 132 and passage 58 together. The passage 164 communicates with the passage 132 anterior to the metering jet 134, and said passage 164 is provided with a restricted orifice 166 adapted to be controlled by a valve 168 and a stem 170 slidable in a guide 172. The unit 162 includes chambers 174 and 176 divided by a diaphragm 178 to which the outer end of the valve stem 170 is attached. A passage 180 connects the passage 132 with the chamber 176 and the pressure of fuel thereby transmitted acts on the diaphragm to urge the valve in the opening direction. Chamber 174 is vented to atmosphere at 182 to relieve any undesirable pressures that might otherwise develop. The unit 162 also includes an outwardly extending portion 184 having a bore therein which slidably receives a plunger 186 which is shown as being in substantial alignment with the valve stem 170. The inner end of the plunger has a spring retainer 188 secured thereto for reception of one end of a spring 190 having its other end received in a spring retainer 192 secured to the diaphragm 178 by the overturned end 194 of a reduced end portion of the valve stem 170. The plunger 186 is adapted to be engaged by a laterally extending arm 196 of a lever 198 pivoted at 200, said lever 198 being adapted to be connected with any suitable control means which may be a manually actuated lever or the like, not shown, operated by the pilot or operator of the airplane.

Movement of the lever 198 in the counterclockwise direction will effect closing of valve 170 which may be variously positioned by the manual control means for controlling the value of the control pressure and therefor the quantity of fuel delivered to the burner 30.

The lever 198 also includes an arm 202 which extends laterally thereof opposite the arm 196 for effecting fuel cut off, movement of said lever 198 in clockwise direction effecting inward movement of the plunger 114 which will move the stud 102 toward the valve 78 until said stud contacts the valve. Further inward movement of the lever 198 will move the valve to the closed position. It is to be noted that the lever 198 is adapted to actuate the plungers separately.

*Operation*

During normal operation, fuel is supplied under pressure to the inlet 56 of the centrifugal pump 126 by means such as the fuel pump 50 although other means may also be employed to supply fuel to said inlet 56. Fuel received by pump 126 is discharged under an increased pressure into passage 132 from which it flows through metering orifice 134 to chamber 72, past valve 78 which is opened by the pressure of fuel in chamber 72 acting on diaphragm 66, into conduit 80, and thence to the nozzle 82 of the burner 30.

Due to the inherent characteristics of the centrifugal pump 126, the pressure C at the outlet of said pump 126 will be greater than the pump inlet pressure D by an amount which is directly proportional to the square of the speed of the pump and consequently directly proportional to the square of the engine speed.

During operation, with the valve 140 closed and valve 168 in a partially open position, fuel at pressure C will flow through the calibrated restriction 166 into passage 58 and then through orifice 120 to the pump inlet 122. As a consequence the pressure in passage 58, herein referred to as control pressure A, will be of a value intermediate the fuel pressure C and pump inlet pressure D, and its value relative to the pressures C and D will depend upon the effective size of orifice 166 relative to the area of orifice 120. For any fixed setting of valve 168, pressure A will remain greater than pressure D and less than pressure C by amounts representing constant percentages of the difference between pressures C and D. Thus, if orifice 166 has an effective area equal to orifice 120, pressure A will remain substantially half way between pressures C and D irrespective of variations in speed of pump 126. It therefore follows that the differential between pressures C and A will likewise vary as the square of engine speed, for a fixed setting of valve 168.

Since the springs 84 and 100 are substantially in balance, except for considerations hereinafter explained, the pressure of the fuel in chamber 72, referred to herein as metered fuel pressure B, will be maintained equal to control pressure A. In the event pressure B should tend to exceed pressure A the valve 78 will tend to open to allow the escape of additional fuel to the nozzle and consequent lowering of pressure B, and the reverse action will occur if B tends to be less than A. It is thus clear that the difference between pressure C and pressure B likewise will vary as the square of the engine speed for a given setting of valve 168.

As is generally known, the quantity of fuel which will flow through a given size metering orifice such as metering jet 134 will vary in proportion to the square root of the differential in pressures C and B on opposite sides of the orifice, and since this differential varies as the square of the engine speed, it will be apparent that the quantity of fuel flowing through orifice 134 for a given setting of valve 168 will vary directly as the engine speed.

With the above described arrangement the pilot or operator manually varies the position of valve 168 to control the quantity of fuel supplied to the burner 30 and consequently the speed of engine. Thus should the pilot move the valve 168 in the closing or opening direction to obtain a selected speed, the engine will speed up or slow down to a speed corresponding to the rate of fuel feed set by the control lever 198.

The altitude control unit 142 is arranged so that valve 140 is closed at sea level and as the airplane ascends the reduced air pressure on bellows 148 will result in expansion of said bellows and corresponding opening of valve 140. Opening of valve 140 results in an increase of pressure A which tends to urge valve 78 to a more nearly closed position thereby reducing the quantity of fuel supplied as is desired as the density of the air decreases with an increase in altitude. Descent of the plane causes valve 140 to move in the closing direction with a corresponding increase of fuel flow past valve 78. Thus compensation for variations in altitudes are automatically provided.

Provision may be made for enriching the idling fuel mixture as is desired. One means for effecting idle enrichment is to adjust valve 78 so that it is normally slightly open. Thus the fuel metering differential pressure required to balance the diaphragm assembly is increased. Then at low differential pressures, corresponding to idle operation, the arrangement is of material effect in producing a relatively large increase in fuel flow, thereby providing the desired rich mixture at idle. However at high differential pressures the arrangement has a negligible effect and has substantially no effect on the richness of the fuel mixture which is maintained at the normal fuel to air ratio.

It is thought that the invention and many of its attendant advantages will be understood from the foregoing description and it will be understood that various changes may be made in the form, construction and arrangement of the parts without departing from the spirit and scope of the invention or sacrificing all of its material advantages, the embodiment herein described being merely a preferred one.

We claim:

1. In a fuel supply system for a gas turbine engine having a burner therein adapted to receive air under pressure: a main conduit adapted to deliver fuel from a source to said burner, rotary means in said conduit for varying the pressure of the fuel in said conduit by an amount substantially proportional to the square of turbine speed, and governor means adapted to regulate said speed by regulating the quantity of fuel delivered by said conduit.

2. In a fuel supply system for a gas turbine engine having a burner therein adapted to receive air under pressure: a conduit adapted to deliver fuel from a source to said burner, rotary means for varying the pressure in said conduit by an amount substantially proportional to the square of turbine speed, a manually operated means adapted to regulate said speed by regulating the quantity of fuel delivered by said conduit, a valvular means in said conduit for controlling the flow of fuel, and a passageway for transmitting a control pressure developed by said rotary means to act on said valvular means for influencing the function thereof.

3. The invention defined in claim 2 including a means for varying the control pressure in accordance with variations in barometric pressure.

4. The invention defined in claim 2 wherein the valvular means for controlling the fuel flow is slightly open for idling and a means is provided for closing said valvular means to cut off the flow of the fuel to the engine.

5. The invention defined in claim 2 wherein the valvular means for controlling the fuel flow includes yielding means so adjusted that the valve is slightly open when the system is inoperative and means for closing said valve, said last mentioned means being controlled by the manual means.

6. In a fuel supply system for a gas turbine engine having a burner therein adapted to receive air under pressure: a conduit adapted to deliver fuel from a source to said burner, rotary means for varying the pressure of the fuel in said conduit by an amount substantially proportional to the square of the speed of a turbine, a passageway communicating with said conduit on either side of said rotary means, a metering jet disposed in said conduit downstream of said passageway, a control valve in said conduit posterior to said metering jet regulated by the pressure in said passageway, and a means adapted to control the speed of said turbine by regulating the pressure in said passageway.

7. In a fuel supply system for a gas turbine engine having a burner therein adapted to receive air under pressure: a conduit adapted to deliver fuel from a source to said burner, pump means for varying the pressure of the fuel in said conduit by an amount substantially proportional to the square of the speed of a turbine, a passageway communicating with said conduit on either side of said pump means, a metering jet disposed in said conduit downstream of said passageway, a control valve in said conduit posterior to said metering jet regulated by the pressure in said passageway, a means adapted to control the speed of said turbine by regulating the pressure in said passageway, and means to compensate for variations in barometric pressure by varying the pressure in said passageway in accordance with variations in barometric pressure.

8. In a fuel supply system for a gas turbine engine having a burner therein adapted to receive air under pressure: a conduit adapted to deliver fuel from a source to said burner, a pump for varying the pressure of the fuel in said conduit by an amount substantially proportional to the square of the speed of a turbine, a manually operated means adapted to regulate said speed by regulating the quantity of fuel delivered by said conduit, a valvular means in said conduit for controlling the flow of fuel in said conduit, and a passageway for transmitting a control pressure developed by said pump to act on said valvular means for influencing the function thereof.

9. In a fuel supply system for a gas turbine engine having a burner therein adapted to receive air under pressure from a rotary air compressor: a conduit adapted to deliver fuel from a source to said burner, a pump adapted to vary the pressure of the fuel in said conduit by an amount substantially proportional to the square of the speed of a compressor, a passageway communicating with said conduit on either side of said pump, a metering jet disposed in said conduit downstream from said passageway, a control valve in said conduit posterior to said metering jet regulated by the pressure in said passageway, and a manually operated means adapted to control the speed of said turbine by regulating the pressure in said passageway.

10. The invention defined in claim 9 wherein the manually operated means includes a valve, a diaphragm to which the valve is attached, and means for subjecting the diaphragm to fuel pressure for urging the same in the opening direction.

11. The invention defined in claim 9 wherein there is a manually controlled means for cutting off the supply of fuel to the burner by closing said control valve.

12. In a fuel supply system for a gas turbine engine having a burner therein adapted to receive air under pressure from a rotary air compressor: a conduit adapted to deliver fuel from a source to said burner, a pump adapted to vary the pressure of the fuel in said conduit by an amount substantially proportional to the square of the speed of a compressor, a passageway communicating with said conduit on either side of said pump, a metering jet disposed in said conduit downstream from said passageway, a control valve in said conduit posterior to said metering jet regulated by the pressure in said passageway, a manually operated means adapted to control the speed of said turbine by regulating the pressure in said passageway, and means to compensate for variations in barometric pressure by varying the pressure in said passageway in accordance with variations in the barometric pressure.

13. In a fuel supply system for a gas turbine engine having a burner therein adapted to receive air under pressure from a rotary compressor and to receive fuel from said fuel supply system: a centrifugal impeller adapted to be driven by the engine, a fuel inlet passage for supplying fuel to the impeller, an outlet passage into which the impeller discharges fuel under a pressure varying with variations in impeller speed, a metering orifice in the outlet passage, a conduit connecting the outlet passage anterior to the metering orifice to the inlet passage, three restrictions in said conduit, two of which are in parallel, a valve in the outlet passage posterior to the metering orifice responsive to the pressure in the conduit between said restrictions, a manually operated means for regulating the speed of said engine by varying the size of one of said parallel restrictions, and a mechanism responsive to variations in barometric pressure for varying the size of the other of said parallel restrictions.

EMIL O. WIRTH.
FREDERIK BARFOD.

References Cited in the file of this patent

UNITED STATES PATENTS

| Number | Name | Date |
|---|---|---|
| 1,437,861 | Porter | Dec. 5, 1922 |
| 2,035,689 | Bryant | Mar. 31, 1936 |
| 2,095,991 | Lysholm | Oct. 19, 1937 |
| 2,353,269 | Roth | July 11, 1944 |
| 2,374,844 | Stokes | May 1, 1945 |
| 2,397,984 | Schorn | Apr. 9, 1946 |
| 2,405,888 | Holley, Jr. | Aug. 13, 1946 |
| 2,407,115 | Udale | Sept. 3, 1946 |
| 2,419,171 | Simpson | Apr. 15, 1947 |
| 2,440,567 | Armstrong | Apr. 27, 1948 |
| 2,456,603 | Barford | Dec. 14, 1948 |
| 2,456,604 | Barfod et al. | Dec. 14, 1948 |
| 2,581,275 | Mock | Jan. 1, 1952 |

FOREIGN PATENTS

| Number | Country | Date |
|---|---|---|
| 429,682 | Great Britain | June 4, 1935 |